US012697601B2

(12) United States Patent
Morishima

(10) Patent No.: US 12,697,601 B2
(45) Date of Patent: Aug. 4, 2026

(54) WATER-ABSORBING RESIN, ABSORBER, AND ABSORBENT ARTICLE

(71) Applicant: SUMITOMO SEIKA CHEMICALS CO., LTD., Kako-gun (JP)

(72) Inventor: Shota Morishima, Himeji (JP)

(73) Assignee: Sumitomo Seika Chemicals Co., Ltd., Hyogo (JP)

( * ) Notice: Subject to any disclaimer, the term of this patent is extended or adjusted under 35 U.S.C. 154(b) by 561 days.

(21) Appl. No.: 18/249,532

(22) PCT Filed: Oct. 18, 2021

(86) PCT No.: PCT/JP2021/038488
§ 371 (c)(1),
(2) Date: Apr. 18, 2023

(87) PCT Pub. No.: WO2022/085643
PCT Pub. Date: Apr. 28, 2022

(65) Prior Publication Data
US 2023/0398516 A1      Dec. 14, 2023

(30) Foreign Application Priority Data

Oct. 19, 2020    (JP) ................................. 2020-175574

(51) Int. Cl.
*B01J 20/26*        (2006.01)
*B01J 20/28*        (2006.01)
(52) U.S. Cl.
CPC ....... *B01J 20/261* (2013.01); *B01J 20/28004* (2013.01)
(58) Field of Classification Search
None
See application file for complete search history.

(56) References Cited

U.S. PATENT DOCUMENTS

| | | | |
|---|---|---|---|
| 5,180,798 A | 1/1993 | Nakamura et al. | |
| 6,730,819 B1 | 5/2004 | Pesce | |
| 2004/0157971 A1 | 8/2004 | Kim | |
| 2005/0085604 A1 | 4/2005 | Handa et al. | |
| 2017/0081443 A1 | 3/2017 | Tanimura et al. | |

FOREIGN PATENT DOCUMENTS

| | | | | |
|---|---|---|---|---|
| CN | 1615319 A | 5/2005 | | |
| JP | H01-223161 A | 9/1989 | | |
| JP | H03-227301 A | 10/1991 | | |
| JP | 2003-176223 A | 6/2003 | | |
| JP | 2008106398 A | * 5/2008 | ........... | D06M 15/59 |
| JP | 2009-007583 A | 1/2009 | | |
| JP | 2013-100543 A | 5/2013 | | |
| JP | 2019-026527 A | 2/2019 | | |
| JP | 2020/022662 A | 2/2020 | | |
| WO | WO 00/51652 A1 | 9/2000 | | |
| WO | WO 2011/103183 A1 | 8/2011 | | |
| WO | WO 2015/146603 A1 | 10/2015 | | |

OTHER PUBLICATIONS

International Search Report received in International PCT Application No. PCT/JP2021/038488, dated Dec. 14, 2021.
Office Action in counterpart Chinese Patent App. No. 202180071633, dated Apr. 30, 2025 (in 12 pages).
Extended European Search Report from EP 21882784.8, dated Oct. 14, 2024 (in 7 pages).

* cited by examiner

*Primary Examiner* — Daniel Berns
(74) *Attorney, Agent, or Firm* — Knobbe, Martens, Olson & Bear, LLP

(57) ABSTRACT

Provided is a water-absorbing resin with which the enzyme activity of a urease that generates ammonia from urea can be inhibited and a pH increase on the surface of an absorbent article, which causes skin rashes or the like, can be suppressed. This water-absorbing resin has an oxidation-reduction potential of a swollen gel of at least 260 mV, as measured by the following oxidation-reduction potential measuring method. (Oxidation-reduction potential measuring method) 60 mL of ion exchange water having an oxidation-reduction potential of 390±10 mV is added to a beaker. The oxidation-reduction potential of the ion exchange water is measured after an electrode of a pH meter is inserted into the ion exchange water and left alone for 15 minutes. Next, 2.0 g of a water-absorbing resin is added to the ion exchange water that is being stirred at 400 rpm, and the resultant is stirred to obtain a swollen gel. An electrode of a pH meter is inserted into the swollen gel and left alone for 15 minutes, and then the oxidation-reduction potential thereof is measured.

6 Claims, No Drawings

WATER-ABSORBING RESIN, ABSORBER, AND ABSORBENT ARTICLE

TECHNICAL FIELD

The present invention relates to a water-absorbing resin, an absorber, and an absorbent article and more particularly to a water-absorbing resin constituting an absorber suitably used for sanitary supplies such as disposable diapers, sanitary napkins, and incontinence pads, an absorber, and an absorbent article.

BACKGROUND ART

In recent years, water-absorbing resins have been widely used in the field of sanitary supplies such as disposable diapers, sanitary napkins, and incontinence pads.

As such a water-absorbing resin, a crosslinked product of a partially neutralized acrylic acid polymer is considered to be a preferable water-absorbing resin because it has an excellent water-absorbing capacity, and acrylic acid as a raw material thereof is easily industrially available, which has many advantages such as an ability to be produced at a low cost with a uniform quality and little likelihood of being putrefied or deteriorated (see, for example, Patent Document 1).

On the other hand, an absorbent article such as a disposable diaper, a sanitary napkin, and an incontinence pad mainly includes an absorber that absorbs and holds body fluids such as urine and menstrual blood excreted from the body and is disposed in a central portion, a liquid-permeable surface sheet (top sheet) disposed on a side in contact with the body, and a liquid-impermeable underside sheet (back sheet) disposed on a side opposite to the side in contact with the body. The absorber is usually composed of hydrophilic fibers such as pulp and a water-absorbing resin.

PRIOR ART DOCUMENT

Patent Document

Patent Document 1: Japanese Patent Laid-open Publication No. H3-227301

SUMMARY OF THE INVENTION

Problems to be Solved by the Invention

Absorbent articles such as disposable diapers and incontinence pads are used so as to be always in contact with human skin, and therefore resident skin bacteria adhere to the surface thereof. It is known that microbes having urease are included in the resident skin bacteria, and urease has enzyme activity of decomposing urea contained in urine into ammonia.

It is known that when urea is decomposed by urease to generate ammonia, the pH of the skin surface increases, which causes skin disorders such as skin rashes.

A main object of the present invention is to provide a water-absorbing resin with which the enzyme activity of urease that generates ammonia from urea can be inhibited and a pH increase on the surface of an absorbent article, which causes skin rashes or the like, can be suppressed.

Means for Solving the Problem

The present inventors have conducted intensive studies in order to solve the above problems. As a result, the present inventors have found that by using a water-absorbing resin having a predetermined oxidation-reduction potential of a swollen gel, the enzyme activity of urease is inhibited, and an increase in pH of the surface of the absorbent article, which causes skin rashes or the like, can be suppressed. The present invention has been completed through further intensive studies based on such findings.

That is, the present invention provides an invention having the following configurations.

Item 1. A water-absorbing resin having an oxidation-reduction potential of a swollen gel of 260 mV or more, as measured by an oxidation-reduction potential measuring method below.

(Oxidation-Reduction Potential Measuring Method)

To a beaker, 60 mL of ion exchange water having an oxidation-reduction potential of 390±10 mV is added. The oxidation-reduction potential of the ion exchange water is measured after an electrode of a pH meter is inserted into the ion exchange water and left standing for 15 minutes.

Next, 2.0 g of the water-absorbing resin is added to the ion exchange water that is being stirred at 400 rpm, and the resultant is stirred to obtain the swollen gel. An electrode of a pH meter is inserted into the swollen gel and left standing for 15 minutes, and then the oxidation-reduction potential thereof is measured.

Item 2. The water-absorbing resin according to item 1, in which the oxidation-reduction potential of the swollen gel is 1,000 mV or less.

Item 3. The water-absorbing resin according to item 1 or 2, having a physiological-saline absorption amount of 30 g/g or more and 80 g/g or less.

Item 4. The water-absorbing resin according to any one of items 1 to 3, having a median particle diameter of 200 μm or more and 600 μm or less.

Item 5. The water-absorbing resin according to any one of items 1 to 4, in which the pH of the swollen gel measured by a pH measuring method below is 8.0 or less.

(pH Measuring Method)

By mixing and dissolving 25.0 g of urea, 9.0 g of sodium chloride, 0.6 g of magnesium sulfate heptahydrate, 0.7 g of calcium lactate, 4.0 g of potassium sulfate, and 2.5 g of ammonium sulfate in distilled water, a total of 1,000 g of artificial urine is prepared.

Urease (derived from jack beans, 50% glycerol solution, 1,000 U/mL) is diluted to prepare a 2-U/mL urease aqueous solution.

A test liquid is prepared by mixing 30.0 g of the artificial urine and 1.0 mL of the urease aqueous solution.

The test liquid is put into a petri dish containing 1.0 g of the water-absorbing resin to obtain the swollen gel, the swollen gel is immediately sealed in a 2-L Tedlar bag, and air in the bag is removed.

Using a 200-mL glass syringe, 900 mL (total volume) of dry air that has passed through an activated carbon bed is added into the 2-L Tedlar bag.

The 2-L Tedlar bag in which the swollen gel is sealed is stored for 24 hours in a tabletop thermo-hygrostat set at a temperature of 35±2° C. and a relative humidity of 60±2%.

After storage for 24 hours, the swollen gel is taken out of the 2-L Tedlar bag, added to a beaker together with 200 g of physiological saline, and stirred with a stirrer for 1 minute.

The pH of the content of the beaker is measured using a pH meter.

Item 6. An absorber including the water-absorbing resin according to any one of items 1 to 5.

Item 7. An absorbent article including the absorber according to item 6.

Advantages of the Invention

The present invention can provide a water-absorbing resin with which the enzyme activity of urease that generates ammonia from urea can be inhibited and a pH increase on the surface of an absorbent article, which causes skin rashes or the like, can be suppressed. Furthermore, the present invention can also provide an absorber and an absorbent article including the water-absorbing resin.

EMBODIMENTS OF THE INVENTION

1. Water-Absorbing Resin

A water-absorbing resin of the present invention has an oxidation-reduction potential of a swollen gel of 260 mV or more, as measured by an oxidation-reduction potential measuring method below.

(Oxidation-Reduction Potential Measuring Method)

To a beaker, 60 mL of ion exchange water having an oxidation-reduction potential of 390±10 mV is added. The oxidation-reduction potential of the ion exchange water is measured after an electrode of a pH meter is inserted into the ion exchange water and left standing for 15 minutes.

Next, 2.0 g of the water-absorbing resin is added to the ion exchange water that is being stirred at 400 rpm, and the resultant is stirred to obtain the swollen gel. An electrode of a pH meter is inserted into the swollen gel and left standing for 15 minutes, and then the oxidation-reduction potential thereof is measured. A specific measuring method is as described in examples.

By applying the water-absorbing resin of the present invention having such features to an absorbent article, the enzyme activity of urease that generates ammonia from urea can be inhibited, and a pH increase on the surface of the absorbent article, which causes skin rashes or the like, can be suppressed. The mechanism of these effects can be considered as follows.

It is known that the enzyme activity of urease depends on thiol groups of urease. The present inventors presumed that when the thiol group is oxidized, the thiol group reacts with an adjacent thiol group to form a disulfide bond, so that the enzyme activity of urease is lost. That is, the present inventors have conducted further studies on the basis of the presumption that an increase in pH can be suppressed when the water-absorbing resin is placed in an oxidizing atmosphere, which is not a reducing atmosphere, in a swollen gel state in which the water-absorbing resin has absorbed urine or the like, and as a result, it has become clear that, for the water-absorbing resin, when the oxidation-reduction potential of the swollen gel measured by the predetermined measuring method is adjusted to 260 mV or more, the enzyme activity of urease is reduced to suppress an increase in pH. Hereinafter, the water-absorbing resin of the present invention will be described in detail.

The oxidation-reduction potential of the swollen gel is 260 mV or more, preferably 280 mV or more, more preferably 290 mV or more, still more preferably 300 mV or more, still more preferably 310 mV or more, from the viewpoint of more suitably exhibiting the effect of the present invention. The oxidation-reduction potential is preferably 1,000 mV or less, more preferably 800 mV or less, still more preferably 500 mV or less. Preferable ranges of the oxidation-reduction potential are 260 to 1,000 mV, 260 to 800 mV, 260 to 500 mV, 280 to 1,000 mV, 280 to 800 mV, 280 to 500 mV, 290 to 1,000 mV, 290 to 800 mV, 290 to 500 mV, 300 to 1,000 mV, 300 to 800 mV, 300 to 500 mV, 310 to 1,000 mV, 300 to 800 mV, and 310 to 500 mV.

The pH of the swollen gel of the water-absorbing resin of the present invention measured by the following pH measuring method is preferably 8.0 or less, more preferably 7.9 or less, still more preferably 7.8 or less, still more preferably 7.7 or less, still more preferably 7.6 or less, still more preferably 7.5 or less, still more preferably 7.0 or less, still more preferably 6.5 or less. The pH is preferably 5.0 or more, more preferably 6.0 or more. Preferable ranges of the pH are 5.0 to 8.0, 5.0 to 7.9, 5.0 to 7.8, 5.0 to 7.7, 5.0 to 7.6, 5.0 to 7.5, 5.0 to 7.0, 5.0 to 6.5, 6.0 to 8.0, 6.0 to 7.9, 6.0 to 7.8, 6.0 to 7.7, 6.0 to 7.6, 6.0 to 7.5, 6.0 to 7.0, and 6.0 to 6.5.

(pH Measuring Method)

By mixing and dissolving 25.0 g of urea, 9.0 g of sodium chloride, 0.6 g of magnesium sulfate heptahydrate, 0.7 g of calcium lactate, 4.0 g of potassium sulfate, and 2.5 g of ammonium sulfate in distilled water, a total of 1,000 g of artificial urine is prepared.

Urease (derived from jack beans, 50% glycerol solution, 1,000 U/mL) is diluted to prepare a 2-U/mL urease aqueous solution.

A test liquid is prepared by mixing 30.0 g of the artificial urine and 1.0 mL of the urease aqueous solution.

The test liquid is put into a petri dish containing 1.0 g of the water-absorbing resin to obtain the swollen gel, the swollen gel is immediately sealed in a 2-L Tedlar bag, and air in the bag is removed.

Using a 200-mL glass syringe, 900 mL (total volume) of dry air that has passed through an activated carbon bed is added into the 2-L Tedlar bag.

The 2-L Tedlar bag in which the swollen gel is sealed is stored for 24 hours in a tabletop thermo-hygrostat set at a temperature of 35±2° C. and a relative humidity of 60±2%.

After storage for 24 hours, the swollen gel is taken out of the 2-L Tedlar bag, added to a beaker together with 200 g of physiological saline, and stirred with a stirrer for 1 minute.

The pH of the content of the beaker is measured using a pH meter. A specific measuring method is as described in examples.

The physiological-saline absorption amount of the water-absorbing resin of the present invention is preferably 30 g/g or more, 35 g/g or more, 40 g/g or more, 45 g/g or more, 50 g/g or more, or 55 g/g or more, from the viewpoint of easily enhancing the absorption performance in the absorbent article. The water absorption amount is preferably 80 g/g or less, 75 g/g or less, 70 g/g or less, 65 g/g or less, 60 g/g or less, or 63 g/g or less. From these viewpoints, the water absorption amount is preferably 30 to 80 g/g, more preferably 45 to 65 g/g.

Regarding the water-absorbing resin of the present invention, the means for adjusting the oxidation-reduction potential of the swollen gel to 260 mV or more is not particularly limited, and examples thereof include a method of adding an oxidizing agent to the water-absorbing resin, a method of adding an oxidizing agent and a reducing agent to the water-absorbing resin, and a method of not adding a reducing agent or a compound having a reducing effect to the water-absorbing resin. Examples of these oxidizing agents include isothiazoline derivatives such as 1,3-benzisothiazolin-3-one and 5-chloro-2-methyl-4-isothiazolin-3-one, polyhydric carboxylic acids such as butane-1,2,3,4-tetracarboxylic acid and 1,2,3,4,5-pentanepentacarboxylic acid, halide derivatives such as chloramine-T trihydrate and trichloroisocyanuric acid, chlorites such as sodium chlorite, hypochlorites such as sodium hypochlorite, potassium hypochlorite, and calcium hypochlorite, and peroxides such as hydrogen peroxide, sodium peroxide, potassium peroxide, potassium permanganate, sodium peroxoborate, benzoyl peroxide, and lauroyl peroxide. One kind or two or more kinds of oxidizing agents may be contained in the water-absorbing resin. Examples of the reducing agent used together with the oxidizing agent include sulfites such as sodium sulfite, potassium sulfite, calcium sulfite, zinc sulfite, and ammonium sulfite, hydrogen sulfites such as sodium hydrogen sulfite, potassium hydrogen sulfite, calcium hydrogen sulfite, and ammonium hydrogen sulfite, pyrosulfites such as sodium pyrosulfite, potassium pyrosulfite, and ammonium pyrosulfite, dithionites such as sodium dithionite, potassium dithionite, ammonium dithionite, calcium dithionite, and zinc dithionite, trithionates such as potassium trithionate and sodium trithionate, tetrathionates such as potassium tetrathionate and sodium tetrathionate, thiosulfates such as sodium thiosulfate, potassium thiosulfate, and ammonium thiosulfate, and nitrites such as sodium nitrite, potassium nitrite, calcium nitrite, and zinc nitrite. One kind or two or more kinds of reducing agents may be contained in the water-absorbing resin.

When the oxidizing agent is used, or when the oxidizing agent and the reducing agent are used, the amount of the oxidizing agent or reducing agent to be added to the water-absorbing resin is such that the oxidation-reduction potential of the swollen gel is 260 mV or more, and the amount may be, for example, 10 parts by mass or less, 5 parts by mass or less, 1 part by mass or less, or 0.1 parts by mass or less with respect to 100 parts by mass of the water-absorbing resin. The lower limit of the amount of the oxidizing agent to be added to the absorbing resin may be 0.01 parts by mass or more with respect to 100 parts by mass of the water-absorbing resin. When the oxidizing agent is used, or when the oxidizing agent and the reducing agent are used, the time when the oxidizing agent or reducing agent is added (timing of inclusion into the water-absorbing resin) may be, for example, any stage from any step from the polymerization step of a water-soluble ethylenic unsaturated monomer constituting the water-absorbing resin to the drying step of the water-absorbing resin to addition to the crosslinked polymer after drying. The addition of the oxidizing agent and the reducing agent may be performed simultaneously or in separate steps. Furthermore, the oxidizing agent and the reducing agent may each be added in a plurality of steps. Among them, the oxidizing agent is preferably added after the drying step, and when the reducing agent is added together, the reducing agent is preferably added before the drying step.

Next, the water-absorbing resin of the present invention will be described in detail.

(Water-Absorbing Resin)

The water-absorbing resin of the present invention is constituted of a product obtained by crosslinking a polymer of a water-soluble ethylenic unsaturated monomer, that is, a crosslinked polymer having a structural unit derived from a water-soluble ethylenic unsaturated monomer.

The water-absorbing resin is usually in the form of particles. The water-absorbing resin of the present invention has a median particle diameter of preferably 200 to 600 μm, more preferably 200 to 500 μm, still more preferably 250 to 450 μm, still more preferably 300 to 425 μm, from the viewpoint of fluidity of a powder, suitability for application to an absorbent article, and the like.

The water-absorbing resin may be in a form in which fine particles (primary particles) are aggregated (secondary particles) in addition to a form in which particles of the water-absorbing resin are single particles. Examples of the shape of the primary particles include a substantially spherical shape, an indefinite crushed shape, and a plate shape. Examples of the primary particles produced by reversed phase suspension polymerization include substantially spherical single particles having a smooth surface shape such as a perfect spherical shape and an ellipsoidal shape. The primary particles having such a shape and having a smooth surface shape thus have high fluidity as a powder, and aggregated particles are easily densely packed and thus are less likely to be broken even when subjected to impact, so that a water-absorbing resin having high particle strength is provided.

The median particle diameter of the water-absorbing resin can be measured using a JIS standard sieve. Specifically, the median particle diameter is a value measured by the method described in examples.

As a polymerization method of the water-soluble ethylenic unsaturated monomer, an aqueous solution polymerization method, an emulsion polymerization method, a reversed phase suspension polymerization method, and the like, which are representative polymerization methods, are used. In the aqueous solution polymerization method, polymerization is performed by heating a water-soluble ethylenic unsaturated monomer aqueous solution while stirring the aqueous solution as necessary. In the reversed phase suspension polymerization method, polymerization is performed by heating a water-soluble ethylenic unsaturated monomer in a hydrocarbon dispersion medium under stirring. In the present invention, the reversed phase suspension polymerization method is preferable from the viewpoint of enabling precise control of the polymerization reaction and control over a wide particle diameter range.

An example of a method for producing the water-absorbing resin will be described below.

Specific examples of the method for producing a water-absorbing resin include a method for producing a water-absorbing resin by performing reversed phase suspension polymerization of a water-soluble ethylenic unsaturated monomer in a hydrocarbon dispersion medium, the method including a step of performing polymerization in the presence of a radical polymerization initiator and a step of post-crosslinking a hydrous gel obtained by the polymerization in the presence of a post-crosslinking agent. In the method for producing a water-absorbing resin of the present invention, an internal crosslinking agent may be added to the water-soluble ethylenic unsaturated monomer as necessary to form a hydrous gel having an internal crosslinked structure.

<Polymerization Step>

[Water-Soluble Ethylenic Unsaturated Monomer]

Examples of the water-soluble ethylenic unsaturated monomer include (meth)acrylic acid (in the present specification, "acrylic" and "methacrylic" are collectively referred to as "(meth)acrylic". The same applies hereinafter) and salts thereof; 2-(meth)acrylamido-2-methylpropane sulfonic acid and salts thereof; nonionic monomers such as (meth)acrylamide, N,N-dimethyl(meth)acrylamide, 2-hydroxyethyl (meth)acrylate, N-methylol(meth)acrylamide, and polyethylene glycol mono(meth)acrylate; and amino group-containing unsaturated monomers such as N,N-diethylaminoethyl (meth)acrylate, N,N-diethylaminopropyl (meth)acrylate, and diethylaminopropyl(meth)acrylamide and quaternized products thereof. Among these water-soluble ethylenic unsaturated monomers, (meth)acrylic acid or a salt thereof, (meth)acrylamide, and N,N-dimethylacrylamide are preferable, and (meth)acrylic acid and a salt thereof are more preferable from the viewpoint of industrial availability and the like. These water-soluble ethylenic unsaturated monomers may be used singly or in combination of two or more kinds thereof.

Among them, acrylic acid and salts thereof are widely used as raw materials of water-absorbing resins, and these acrylic acid and/or a salt thereof may be copolymerized with another one of the above water-soluble ethylenic unsaturated monomers. In this case, acrylic acid and/or a salt thereof is preferably used as a main water-soluble ethylenic unsaturated monomer in an amount of 70 to 100 mol % with respect to the total amount of water-soluble ethylenic unsaturated monomers.

The water-soluble ethylenic unsaturated monomer is preferably dispersed in a hydrocarbon dispersion medium in a state of an aqueous solution and subjected to reversed phase suspension polymerization. When the water-soluble ethylenic unsaturated monomer is in an aqueous solution, the dispersion efficiency in the hydrocarbon dispersion medium can be increased. The concentration of the water-soluble ethylenic unsaturated monomer in this aqueous solution is preferably in the range of 20 mass % to a saturated concentration. The concentration of the water-soluble ethylenic unsaturated monomer is more preferably 55 mass % or less, still more preferably 50 mass % or less, still more preferably 45 mass % or less. On the other hand, the concentration of the water-soluble ethylenic unsaturated monomer is more preferably 25 mass % or more, still more preferably 28 mass % or more, still more preferably 30 mass % or more.

When the water-soluble ethylenic unsaturated monomer has an acid group such as (meth)acrylic acid and 2-(meth) acrylamide-2-methylpropanesulfonic acid, a compound in which the acid group has been neutralized in advance with an alkaline neutralizing agent as necessary may be used. Examples of such an alkaline neutralizing agent include alkali metal salts such as sodium hydroxide, sodium carbonate, sodium hydrogen carbonate, potassium hydroxide, and potassium carbonate; and ammonia. In addition, these alkaline neutralizing agents may be used in the form of an aqueous solution in order to simplify the neutralization operation. The above alkaline neutralizing agents may be used singly or in combination of two or more kinds thereof.

The neutralization degree of the water-soluble ethylenic unsaturated monomer with the alkaline neutralizing agent is preferably 10 to 100 mol %, more preferably 30 to 90 mol %, still more preferably 40 to 85 mol %, still more preferably 50 to 80 mol %, as the neutralization degree with respect to all the acid groups of the water-soluble ethylenic unsaturated monomer.

[Radical Polymerization Initiator]

Examples of the radical polymerization initiator added in the polymerization step include persulfates such as potassium persulfate, ammonium persulfate, and sodium persulfate, peroxides such as methyl ethyl ketone peroxide, methyl isobutyl ketone peroxide, di-t-butyl peroxide, t-butyl cumyl peroxide, t-butyl peroxyacetate, t-butyl peroxyisobutyrate, t-butyl peroxypivalate, and hydrogen peroxide, 2,2'-azobis (2-amidinopropane) dihydrochloride, 2,2'-azobis[2-(N-phenylamidino)propane]dihydrochloride, 2,2'-azobis[2-(N-allylamidino)propane] dihydrochloride, and 2,2'-azobis{2-[1-(2-hydroxyethyl)-2-imidazolin-2-yl]propane dihydrochloride, and azo compounds such as 2,2'-azobis{2-methyl-N-[1,1-bis(hydroxymethyl)-2-hydroxyethyl]propionamide}, 2,2'-azobis[2-methyl-N-(2-hydroxyethyl)-propionamide], and 4,4'-azobis(4-cyanovaleric acid). Among these radical polymerization initiators, potassium persulfate, ammonium persulfate, sodium persulfate, and 2,2'-azobis(2-amidinopropane) dihydrochloride are preferable from the viewpoint of easy availability and easy handling. These radical polymerization initiators may be used singly or in combination of two or more. The radical polymerization initiator can also be used as a redox polymerization initiator in combination with a reducing agent such as sodium sulfite, sodium hydrogen sulfite, ferrous sulfate, and L-ascorbic acid.

The amount of the radical polymerization initiator used is, for example, 0.00005 to 0.01 mol with respect to 1 mol of the water-soluble ethylenic unsaturated monomer. By satisfying such a use amount, occurrence of a rapid polymerization reaction can be avoided, and the polymerization reaction can be completed in an appropriate time.

[Internal Crosslinking Agent]

Examples of the internal crosslinking agent include those capable of crosslinking a polymer of a water-soluble ethylenic unsaturated monomer to be used, such as unsaturated polyesters obtained by reacting polyols such as diols and triols such as (poly)ethylene glycol ["(poly)" means with or without a "poly" prefix. The same applies hereinafter], (poly)propylene glycol, 1,4-butanediol, trimethylolpropane, and (poly)glycerol with an unsaturated acid such as (meth) acrylic acid, maleic acid, and fumaric acid; bisacrylamides such as N,N-methylenebisacrylamide; di(meth)acrylic acid esters or tri(meth)acrylic acid esters obtained by reacting a polyepoxide with (meth)acrylic acid; di(meth)acrylic acid carbamyl esters obtained by reacting polyisocyanate such as tolylene diisocyanate and hexamethylene diisocyanate with hydroxyethyl (meth)acrylate; compounds having two or more polymerizable unsaturated groups, such as allylated starch, allylated cellulose, diallyl phthalate, N,N',N''-triallyl isocyanurate, and divinylbenzene; polyglycidyl compounds such as diglycidyl compounds such as (poly)ethylene glycol diglycidyl ether, (poly)propylene glycol diglycidyl ether, and (poly)glycerol diglycidyl ether and triglycidyl compounds; epihalohydrin compounds such as epichlorohydrin, epibromohydrin, and α-methylepichlorohydrin; compounds having two or more reactive functional groups such as isocyanate compounds such as 2,4-tolylene diisocyanate and hexamethylene diisocyanate; and oxetane compounds such as 3-methyl-3-oxetanemethanol, 3-ethyl-3-oxetanemethanol, 3-butyl-3-oxetanemethanol, 3-methyl-3-oxetaneethanol, 3-ethyl-3-oxetaneethanol, and 3-butyl-3-oxetaneethanol. Among these internal crosslinking agents, a polyglycidyl compound is preferably used, a diglycidyl ether compound is more preferably used, and (poly)ethylene glycol diglycidyl ether, (poly)propylene glycol diglycidyl ether, and (poly)glycerol diglycidyl ether are preferably used. These internal crosslinking agents may be used singly or in combination of two or more.

The amount of the internal crosslinking agent used is preferably 0.000001 to 0.02 mol, more preferably 0.00001 to 0.01 mol, still more preferably 0.00001 to 0.005 mol, still more preferably 0.00005 to 0.002 mol, with respect to 1 mol of the water-soluble ethylenic unsaturated monomer.

[Hydrocarbon Dispersion Medium]

Examples of the hydrocarbon dispersion medium include aliphatic hydrocarbons having six to eight carbon atoms such as n-hexane, n-heptane, 2-methylhexane, 3-methylhexane, 2,3-dimethylpentane, 3-ethylpentane, and n-octane; alicyclic hydrocarbons such as cyclohexane, methylcyclohexane, cyclopentane, methylcyclopentane, trans-1,2-dimethylcyclopentane, cis-1,3-dimethylcyclopentane, and trans-1,3-dimethylcyclopentane; and aromatic hydrocarbons such as benzene, toluene, and xylene. Among these hydrocarbon dispersion media, n-hexane, n-heptane, and cyclohexane are particularly preferably used because they are industrially easily available, have stable quality, and are inexpensive. These hydrocarbon dispersion media may be used singly or in combination of two or more. As an example of a mixture of the hydrocarbon dispersion media, a suitable result can be obtained by using a commercially available product such as Exxsol Heptane (manufactured by Exxon Mobil Corporation: containing 75 to 85 mass % of heptane and an isomer hydrocarbon thereof).

The amount of the hydrocarbon dispersion medium used is preferably 100 to 1,500 parts by mass, more preferably 200 to 1,400 parts by mass, with respect to 100 parts by mass of the first-stage water-soluble ethylenic unsaturated monomer from the viewpoint of uniformly dispersing the water-soluble ethylenic unsaturated monomer and facilitating the control of the polymerization temperature. As will be described later, the reversed phase suspension polymerization is performed in one stage (single stage) or multiple stages of two or more stages, and the above-described first-stage polymerization means the first-stage polymerization reaction in the single-stage polymerization or the multi-stage polymerization (the same applies hereinafter).

[Dispersion Stabilizer]

(Surfactant)

In the reversed phase suspension polymerization, a dispersion stabilizer can also be used in order to improve the dispersion stability of the water-soluble ethylenic unsaturated monomer in the hydrocarbon dispersion medium. As the dispersion stabilizer, a surfactant can be used.

Examples of the surfactant used include a sucrose fatty acid ester, a polyglycerol fatty acid ester, a sorbitan fatty acid ester, a polyoxyethylene sorbitan fatty acid ester, a polyoxyethylene glycerol fatty acid ester, a sorbitol fatty acid ester, a polyoxyethylene sorbitol fatty acid ester, a polyoxyethylene alkyl ether, a polyoxyethylene alkyl phenyl ether, a polyoxyethylene castor oil, a polyoxyethylene hydrogenated castor oil, an alkylallyl formaldehyde condensed polyoxyethylene ether, a polyoxyethylene polyoxypropylene block copolymer, a polyoxyethylene polyoxypropyl alkyl ether, a polyethylene glycol fatty acid ester, an alkyl glucoside, an N-alkyl gluconamide, a polyoxyethylene fatty acid amide, a polyoxyethylene alkylamine, a phosphoric acid ester of a polyoxyethylene alkyl ether, and a phosphoric acid ester of a polyoxyethylene alkyl allyl ether. Among these surfactants, it is particularly preferable to use a sorbitan fatty acid ester, a polyglycerol fatty acid ester, or a sucrose fatty acid ester from the viewpoint of dispersion stability of the monomer. These surfactants may be used singly or in combination of two or more.

The amount of the surfactant used is preferably 0.1 to 30 parts by mass, more preferably 0.3 to 20 parts by mass, with respect to 100 parts by mass of the first-stage water-soluble ethylenic unsaturated monomer.

(Polymeric Dispersant)

As the dispersion stabilizer used in the reversed phase suspension polymerization, a polymeric dispersant may be used together with the surfactant described above.

Examples of the polymeric dispersant include maleic anhydride-modified polyethylene, maleic anhydride-modified polypropylene, maleic anhydride-modified ethylene-propylene copolymer, maleic anhydride-modified EPDM (ethylene-propylene-diene terpolymer), maleic anhydride-modified polybutadiene, maleic anhydride-ethylene copolymer, maleic anhydride-propylene copolymer, maleic anhydride-ethylene-propylene copolymer, maleic anhydride-ethylene-propylene copolymer, maleic anhydride-butadiene copolymer, polyethylene, polypropylene, ethylene-propylene copolymer, oxidized polyethylene, oxidized polypropylene, oxidized ethylene-propylene copolymer, ethylene-acrylic acid copolymer, ethyl cellulose, and ethyl hydroxyethyl cellulose. Among these polymeric dispersants, maleic anhydride-modified polyethylene, maleic anhydride-modified polypropylene, maleic anhydride-modified ethylene-propylene copolymer, maleic anhydride-ethylene copolymer, maleic anhydride-propylene copolymer, maleic anhydride-ethylene-propylene copolymer, polyethylene, polypropylene, ethylene-propylene copolymer, oxidized polyethylene, oxidized polypropylene, and oxidized ethylene-propylene copolymer are particularly preferably used from the viewpoint of dispersion stability of the monomer. These polymeric dispersants may be used singly or in combination of two or more.

The amount of the polymeric dispersant used is preferably 0.1 to 30 parts by mass, more preferably 0.3 to 20 parts by mass, with respect to 100 parts by mass of the first-stage water-soluble ethylenic unsaturated monomer.

[Other Components]

In the method for producing a water-absorbing resin, if desired, other components may be added to an aqueous solution containing the water-soluble ethylenic unsaturated monomer to perform reversed phase suspension polymerization. As other components, various additives such as a thickener and a chain transfer agent can be added.

As an example, reversed phase suspension polymerization can be performed with a thickener added to an aqueous solution containing the water-soluble ethylenic unsaturated monomer. Adding a thickener as described above to adjust the viscosity of the aqueous solution enables control of the median particle diameter obtained in the reversed phase suspension polymerization.

As the thickener, for example, hydroxyethyl cellulose, hydroxypropyl cellulose, methyl cellulose, carboxymethyl cellulose, polyacrylic acid, a (partially) neutralized polyacrylic acid, polyethylene glycol, polyacrylamide, polyethyleneimine, dextrin, sodium alginate, polyvinyl alcohol, polyvinyl pyrrolidone, polyethylene oxide, or the like can be used. When the stirring rate during polymerization is constant, the primary particles and/or the secondary particles of the resulting particles tend to be larger as the viscosity of the aqueous solution of the water-soluble ethylenic unsaturated monomer is higher.

[Reversed Phase Suspension Polymerization]

In performing the reversed phase suspension polymerization, for example, a monomer aqueous solution containing the water-soluble ethylenic unsaturated monomer is dispersed in a hydrocarbon dispersion medium in the presence of a dispersion stabilizer. At this time, before the polymerization reaction is started, the addition timing of the dispersion stabilizer (surfactant or polymeric dispersant) may be either before or after the addition of the monomer aqueous solution.

Among them, from the viewpoint of easily reducing the amount of the hydrocarbon dispersion medium remaining in the resulting water-absorbing resin, it is preferable to perform polymerization after dispersing the surfactant in the hydrocarbon dispersion medium in which the polymeric dispersant has been dispersed and in which the monomer aqueous solution has then been dispersed.

Such reversed phase suspension polymerization can be performed in one stage or multiple stages of two or more stages. In addition, from the viewpoint of enhancing productivity, it is preferable to employ two or three stages.

When the reversed phase suspension polymerization is performed in two or more stages, the first-stage reversed phase suspension polymerization is performed, then the water-soluble ethylenic unsaturated monomer is added to and mixed with the reaction mixture obtained in the first-stage polymerization reaction, and the second-stage or subsequent reversed phase suspension polymerization may be performed in the same manner as the first-stage polymerization. In the reversed phase suspension polymerization in each of the second and subsequent stages, in addition to the water-soluble ethylenic unsaturated monomer, a radical polymerization initiator is preferably added within the range of the molar ratio of each component to the water-soluble ethylenic unsaturated monomer described above based on the amount of the water-soluble ethylenic unsaturated monomer added in the reversed phase suspension polymerization in each of the second and subsequent stages to perform reversed phase suspension polymerization. In the second and subsequent polymerization, an internal crosslinking agent may be added to the water-soluble ethylenic unsaturated monomer as necessary.

The reaction temperature of the polymerization reaction is preferably 20 to 110° C., more preferably 40 to 90° C., from the viewpoint of enhancing the economic efficiency by rapidly progressing the polymerization and shortening the polymerization time and easily removing the heat of polymerization to smoothly perform the reaction.

<Post-Crosslinking Step>

Next, the water-absorbing resin of the present invention is obtained by adding a post-crosslinking agent to a hydrous gel having an internally crosslinked structure obtained by polymerizing the water-soluble ethylenic unsaturated monomer, and crosslinking the hydrous gel (post-crosslinking reaction). This post-crosslinking reaction is preferably performed in the presence of a post-crosslinking agent after polymerization of the water-soluble ethylenic unsaturated monomer. As described above, by subjecting the hydrous gel having an internally crosslinked structure to a post-crosslinking reaction after polymerization, it is possible to obtain a water-absorbing resin in which the crosslinking density in the vicinity of the surface of the water-absorbing resin is increased and various performances such as water absorption capacity under load are improved.

Examples of the post-crosslinking agent include compounds having two or more reactive functional groups. Examples include polyols such as ethylene glycol, propylene glycol, 1,4-butanediol, diethylene glycol, triethylene glycol, trimethylolpropane, glycerol, polyoxyethylene glycol, polyoxypropylene glycol, and polyglycerol; polyglycidyl compounds such as (poly)ethylene glycol diglycidyl ether, (poly)glycerol diglycidyl ether, (poly)glycerol triglycidyl ether, trimethylolpropane triglycidyl ether, (poly)propylene glycol polyglycidyl ether, and (poly)glycerol polyglycidyl ether; haloepoxy compounds such as epichlorohydrin, epibromohydrin, and α-methylepichlorohydrin; isocyanate compounds such as 2,4-tolylene diisocyanate and hexamethylene diisocyanate; oxetane compounds such as 3-methyl-3-oxetanemethanol, 3-ethyl-3-oxetanemethanol, 3-butyl-3-oxetanemethanol, 3-methyl-3-oxetaneethanol, 3-ethyl-3-oxetaneethanol, and 3-butyl-3-oxetaneethanol; oxazoline compounds such as 1,2-ethylenebisoxazoline; carbonate compounds such as ethylene carbonate, propylene carbonate, 4,5-dimethyl-1,3-dioxolan-2-one, 4,4-dimethyl-1,3-dioxolan-2-one, 4-ethyl-1,3-dioxolan-2-one, 4-hydroxymethyl-1,3-dioxolan-2-one, 1,3-dioxan-2-one, 4-methyl-1,3-dioxan-2-one, 4,6-dimethyl-1,3-dioxan-2-one, and 1,3-dioxopan-2-one; and hydroxyalkylamide compounds such as bis[N,N-di(β-hydroxyethyl)]adipamide. Among these post-crosslinking agents, polyglycidyl compounds such as (poly)ethylene glycol diglycidyl ether, (poly)glycerol diglycidyl ether, (poly)glycerol triglycidyl ether, trimethylolpropane triglycidyl ether, (poly)propylene glycol polyglycidyl ether, and (poly)glycerol polyglycidyl ether are preferable. These post-crosslinking agents may be used singly or in combination of two or more.

The amount of the post-crosslinking agent used is preferably 0.00001 to 0.01 mol, more preferably 0.00005 to 0.005 mol, still more preferably 0.0001 to 0.002 mol, with respect to a total of 1 mol of the water-soluble ethylenic unsaturated monomer used for the polymerization.

As a method for adding the post-crosslinking agent, the post-crosslinking agent may be added as it is or in the form of an aqueous solution or may be added in the form of a solution containing a hydrophilic organic solvent as a solvent as necessary. Examples of the hydrophilic organic solvent include lower alcohols such as methyl alcohol, ethyl alcohol, n-propyl alcohol, and isopropyl alcohol; ketones such as acetone and methyl ethyl ketone; ethers such as diethyl ether, dioxane, and tetrahydrofuran; amides such as N,N-dimethylformamide; and sulfoxides such as dimethyl sulfoxide. These hydrophilic organic solvents may be used singly or in combination of two or more or may be used in the form of a mixed solvent with water.

The addition timing of the post-crosslinking agent is after almost all the polymerization reaction of the water-soluble ethylenic unsaturated monomer is completed, and the post-crosslinking agent is preferably added in the presence of water in the range of 1 to 400 parts by mass, more preferably in the presence of water in the range of 5 to 200 parts by mass, still more preferably in the presence of water in the range of 10 to 100 parts by mass, still more preferably in the presence of water in the range of 20 to 60 parts by mass with respect to 100 parts by mass of the water-soluble ethylenic unsaturated monomer. The amount of water means the total amount of water contained in the reaction system and water used as necessary when the post-crosslinking agent is added.

The reaction temperature in the post-crosslinking reaction is preferably 50 to 250° C., more preferably 60 to 180° C., still more preferably 60 to 140° C., still more preferably 70 to 120° C. The reaction time of the post-crosslinking reaction is preferably 1 to 300 minutes, more preferably 5 to 200 minutes.

<Drying Step>

The method may include a drying step of removing water, a hydrocarbon dispersion medium, and the like by distillation by externally applying energy such as heat after performing the reversed phase suspension polymerization described above. When dehydration is performed from the hydrous gel after the reversed phase suspension polymerization, the system in which the hydrous gel is dispersed in the hydrocarbon dispersion medium is heated, so that water and the hydrocarbon dispersion medium are temporarily distilled off to the outside of the system by azeotropic distillation. At this time, when only the distilled hydrocarbon dispersion medium is returned into the system, continuous azeotropic distillation becomes possible. In that case, since the temperature in the system during drying is maintained at an azeotropic temperature with the hydrocarbon dispersion medium or lower, that case is preferable from the viewpoint that the resin is hardly deteriorated. Subsequently, water and the hydrocarbon dispersion medium are distilled off to obtain the water-absorbing resin. Various performances of the water-absorbing resin to be obtained can be controlled by controlling the treatment conditions in the drying step after the polymerization to adjust the amount of water to be removed.

In the drying step, the drying treatment by distillation may be performed under normal pressure or under reduced pressure. From the viewpoint of enhancing the drying efficiency, the drying may be performed under a flow of nitrogen or the like. The reaction temperature when the drying treatment is performed under normal pressure is preferably 70 to 250° C., more preferably 80 to 180° C., still more preferably 80 to 140° C., still more preferably 90 to 130° C. When the drying treatment is performed under reduced pressure, the drying temperature is preferably 40 to 160° C., more preferably 50 to 110° C.

When the post-crosslinking step with the post-crosslinking agent is performed after the polymerization of the monomer is performed by reversed phase suspension polymerization, the drying step by distillation described above is performed after the completion of the post-crosslinking step. Alternatively, the post-crosslinking step and the drying step may be performed simultaneously.

The water-absorbing resin of the present invention may further contain an additive according to the purpose. Examples of such additives include inorganic powders, surfactants, metal chelating agents, radical chain inhibitors, antibacterial agents, and antioxidants. For example, by adding 0.05 to 5 parts by mass of amorphous silica as an inorganic powder to 100 parts by mass of the water-absorbing resin, the fluidity of the water-absorbing resin can be further improved.

In the water-absorbing resin of the present invention, the content of the water-absorbing resin (excluding additives) is preferably 70 mass % or more, more preferably 80 mass % or more, still more preferably 90 mass % or more.

2. Absorber and Absorbent Article

The water-absorbing resin of the present invention constitutes an absorber used for sanitary supplies such as sanitary products and disposable diapers and is suitably used for an absorbent article including the absorber.

Here, the absorber using the water-absorbing resin of the present invention contains the water-absorbing resin of the present invention. The absorber may further contain hydrophilic fibers. Examples of the configuration of the absorber include a sheet-like structure in which the water-absorbing resin is fixed on a nonwoven fabric or between a plurality of nonwoven fabrics, a mixed dispersion obtained by mixing the water-absorbing resin and hydrophilic fibers so as to have a uniform composition, a sandwich structure in which the water-absorbing resin is sandwiched between layered hydrophilic fibers, and a structure in which the water-absorbing resin and hydrophilic fibers are wrapped with tissue. The absorber may contain other components, for example, an adhesive binder such as a heat-sealable synthetic fiber, a hot melt adhesive, and an adhesive emulsion for enhancing the shape retention of the absorber.

The content of the water-absorbing resin in the absorber is preferably 5 to 100 mass %, more preferably 10 to 95 mass %, still more preferably 20 to 90 mass %, still more preferably 30 to 80 mass %.

Examples of the hydrophilic fibers include cellulose fibers such as cotton-like pulp, mechanical pulp, chemical pulp, and semi-chemical pulp obtained from wood, artificial cellulose fibers such as rayon and acetate, and fibers made of synthetic resins such as hydrophilized polyamide, polyester, and polyolefin. The average fiber length of the hydrophilic fibers is usually 0.1 to 10 mm or may be 0.5 to 5 mm.

The absorber using the water-absorbing resin of the present invention can be held between a liquid-permeable sheet (top sheet) through which a liquid can pass and a liquid-impermeable sheet (back sheet) through which a liquid cannot pass to form the absorbent article of the present invention. The liquid-permeable sheet is disposed on the side in contact with the body, and the liquid-impermeable sheet is disposed on the side opposite to the side in contact with the body.

Examples of the liquid-permeable sheet include nonwoven fabrics of an air-through type, a spunbond type, a chemical bond type, a needle punch type, or the like made of fibers such as polyethylene, polypropylene, and polyester, and porous synthetic resin sheets. Examples of the liquid-impermeable sheet include synthetic resin films made of resins such as polyethylene, polypropylene, and polyvinyl chloride.

EXAMPLES

Hereinafter, the present invention will be described in detail with reference to examples and comparative examples. However, the present invention is not limited to the examples.

The water-absorbing resins obtained in the following examples and comparative examples were evaluated through the following various tests. Unless otherwise specified, the measurement was performed under an environment of a temperature of 25±2° C. and a humidity of 50±10%. Hereinafter, each evaluation test method will be described.

<Oxidation-Reduction Potential of Swollen Gel of Water-Absorbing Resin>

First, 60 mL of ion exchange water having an oxidation-reduction potential of 390±10 mV was weighed out into a 100-mL plastic beaker, a stir bar (8 mmφ×30 mm) was put therein, and the mixture was stirred at 400 rpm using a magnetic stirrer. Into the beaker, 2.0 g of the water-absorbing resin was put, and stirring was continued until the water-absorbing resin turned into a gel to obtain a swollen gel. Thereafter, an electrode section of a portable pH meter (manufactured by HORIBA, Ltd., pH/ORP METER D-72, electrode model: 9300-10D) was inserted to a position of a depth of 2.5 cm at a location 1 cm away from the inner wall of the beaker, and the value after standing for 15 minutes was taken as the oxidation-reduction potential of the swollen gel of the water-absorbing resin.

<pH of Swollen Gel of Water-Absorbing Resin>

By mixing and dissolving 25.0 g of urea, 9.0 g of sodium chloride, 0.6 g of magnesium sulfate heptahydrate, 0.7 g of calcium lactate, 4.0 g of potassium sulfate, and 2.5 g of ammonium sulfate in distilled water, a total of 1,000 g of artificial urine was prepared. Separately, 1.0 mL of urease (manufactured by Merck & Co., Inc., derived from jack beans, 50% glycerol solution, 1,000 U/mL) was accurately weighed and diluted with distilled water to 500 mL to prepare a 2-U/mL urease aqueous solution. A test liquid was prepared by mixing 30.0 g of the artificial urine and 1.0 mL of the urease aqueous solution. Next, 1.0 g of the water-absorbing resin was placed in a sterilized petri dish (inner diameter: 88 mm), the test liquid was then added, the petri dish containing the resulting swollen gel was immediately sealed in a 2-L Tedlar bag, and suction was repeated using a glass syringe (hygrostat glass syringe, 200 mL, manufactured by Tsuji Seisakusho Co., Ltd.) to remove air in the bag. Thereafter, using a glass syringe, 900 mL (total volume) of dry air that had passed through an activated carbon bed was added into the bag. The 2-L Tedlar bag in which the swollen gel was sealed was stored for 24 hours in a tabletop thermo-hygrostat set at a temperature of 35±2° C. and a relative humidity of 60±2%. Thereafter, the swollen gel was removed from the bag and transferred into a 500-mL plastic beaker while being washed with 200 g of physiological saline. A stir bar (8 mmφ×30 mm) was put in the beaker, the gel was stirred at 600 rpm for 1 minute using a magnetic stirrer, and then an electrode section of a portable pH meter (manufactured by HORIBA, Ltd., pH/ORP METER D-72, electrode model: 9625) was inserted to a position of a depth of 2.5 cm at a location 1 cm away from the inner wall of the beaker. The beaker was allowed to stand for several minutes after the electrode was inserted, and the stabilized value was defined as the pH of the swollen gel of the water-absorbing resin.

<Median Particle Diameter of Water-Absorbing Resin>

JIS standard sieves were combined in the following order from the top: a sieve with a mesh size of 850 μm, a sieve with a mesh size of 600 μm, a sieve with a mesh size of 500 μm, a sieve with a mesh size of 425 m, a sieve with a mesh size of 300 μm, a sieve with a mesh size of 250 μm, a sieve with a mesh size of 150 μm, and a pan.

On the uppermost sieve of the combined sieves, 50 g of the water-absorbing resin was placed and shaken for 10 minutes using a Ro-Tap shaker to perform classification. After classification, the mass of the water-absorbing resin remaining on each sieve was calculated as a mass percentage with respect to the total amount, and the particle size distribution was determined. Using this particle size distribution, by integrating the particles on the sieve in the descending order of particle diameters, the relationship between the mesh size of the sieve and the integrated value of the mass percentage of the water-absorbing resin remaining on the sieve was plotted on log-probability paper. The plots on the probability paper were connected by a straight line, and the particle diameter corresponding to an integrated mass percentage of 50 mass % was defined as the median particle diameter of the water-absorbing resin.

<Physiological Saline Absorption Amount of Water-Absorbing Resin>

In a 500-mL plastic beaker, 500 g of physiological saline and a stir bar (8 mmφ×30 mm without ring) were put and stirred at 600 rpm using a magnetic stirrer. In the 500-mL plastic beaker, 2.0 g of the water-absorbing resin was dispersed in 500 g of physiological saline and sufficiently swollen with stirring at 600 rpm for 1 hour. On the other hand, a mass Wa (g) of a standard sieve having a mesh size of 75 μm was measured, and the aqueous solution containing the swollen gel was filtered through the 75-μm standard sieve. The 75-μm standard sieve was allowed to stand for 30 minutes in a state where the angle formed with respect to the horizontal was inclined at about 30 degrees, so that excess physiological saline was removed from the water-absorbing resin. A sieve mass Wb (g) containing the swollen gel was measured, and the mass obtained by subtracting the mass Wa (g) of the 75-μm standard sieve from the mass Wb (g) was divided by the mass (2.0 g) of the water-absorbing resin to calculate the water absorption amount.

$$\text{Water absorption amount}=(Wb-Wa)\div(\text{mass of water-absorbing resin})$$

Production Example 1

A 2-L round-bottomed cylindrical separable flask having an inner diameter of 11 cm and equipped with a reflux condenser, a dropping funnel, a nitrogen gas introduction tube, and a stirring blade with double 4-winged inclined paddles having a blade diameter of 5 cm as a stirrer was prepared. To this flask, 293 g of n-heptane as a hydrocarbon dispersion medium and 0.736 g of a maleic anhydride-modified ethylene-propylene copolymer (Mitsui Chemicals, Inc., Hi-WAX 1105A) as a polymeric dispersant were added, the temperature was raised to 80° C. with stirring to dissolve the dispersant, and then the mixture was cooled to 50° C. On the other hand, 92.0 g (1.03 mol) of a 80.5 mass % acrylic acid aqueous solution as a water-soluble ethylenic unsaturated monomer was put in a beaker having an internal volume of 300 mL, 147.7 g of a 20.9-mass % sodium hydroxide aqueous solution was added dropwise with cooling with ice water to perform neutralization of 75 mol %, and then 0.092 g of hydroxyethyl cellulose (Sumitomo Seika Chemicals Company, Limited, HECAW-15F) as a thickener, 0.0736 g (0.272 mmol) of potassium persulfate as a water-soluble radical polymerization agent, and 0.010 g (0.057 mmol) of ethylene glycol diglycidyl ether as an internal crosslinking agent were added thereto and dissolved, thereby preparing a first-stage aqueous liquid. Then, the aqueous liquid prepared above was added to the separable flask and stirred for 10 minutes, and then a surfactant solution obtained by heating and dissolving 0.736 g of sucrose stearate (RYOTO Sugar Ester 5-370 manufactured by Mitsubishi-Kagaku Foods Corporation) having an HLB of 3 as a surfactant in 6.62 g of n-heptane in a 20-mL vial was further added. While stirring at a rotation rate of the stirrer of 550 rpm, the inside of the system was sufficiently purged with nitrogen. Thereafter, the flask was immersed in a water bath at 70° C. to be heated, and polymerization was performed for 60 minutes to provide a first-stage polymerization slurry liquid.

On the other hand, 128.8 g (1.43 mol) of a 80.5-mass % acrylic acid aqueous solution as a water-soluble ethylenic unsaturated monomer was put in another beaker having an internal volume of 500 mL, 159.0 g of a 27-mass % sodium hydroxide aqueous solution was added dropwise with cooling with ice water to perform neutralization of 75 mol %, and then 0.103 g (0.381 mmol) of potassium persulfate as a water-soluble radical polymerization initiator and 0.0116 g (0.067 mmol) of ethylene glycol diglycidyl ether as an internal crosslinking agent were added thereto and dissolved, thereby preparing a second-stage aqueous liquid.

The inside of the system in the separable flask was cooled to 25° C. while stirring at a rotation rate of the stirrer of 1,000 rpm, then the whole amount of the second-stage aqueous liquid was added to the first-stage polymerization slurry liquid, and the inside of the system was purged with nitrogen for 30 minutes. Then, the flask was immersed in a water bath at 70° C. again to raise the temperature, and the polymerization reaction was performed for 60 minutes to provide a hydrous gel polymer.

To the hydrous gel polymer after the second-stage polymerization, 4.42 g (1.05 mmol) of a 3-mass % sodium sulfite aqueous solution and 0.589 g (0.526 mmol) of a 45-mass % pentasodium diethylenetriaminepentaacetate aqueous solution were added under stirring. Thereafter, the flask was immersed in an oil bath set at 125° C., and 257.7 g of water was removed to the outside of the system while refluxing n-heptane by azeotropic distillation of n-heptane and water. Thereafter, 4.42 g (0.507 mmol) of a 2-mass % ethylene glycol diglycidyl ether aqueous solution as a surface crosslinking agent was added to the flask, and the mixture was held at 83° C. for 2 hours.

Thereafter, n-heptane was evaporated at 125° C. to dry the mixture, and the mixture was caused to pass through a sieve with a mesh size of 850 μm to provide 228.0 g of a crosslinked polymer.

Production Example 2

Except that the amount of potassium persulfate as a water-soluble radical polymerization initiator added to the second-stage aqueous liquid in Production Example 1 was changed to 0.090 g (0.334 mmol), the same procedure as in Production Example 1 was carried out to provide 234.0 g of a crosslinked polymer.

Production Example 3

A 2-L round-bottomed cylindrical separable flask having an inner diameter of 11 cm and equipped with a reflux condenser, a dropping funnel, a nitrogen gas introduction tube, and a stirring blade with double 4-winged inclined paddles having a blade diameter of 5 cm as a stirrer was prepared. To this flask, 293 g of n-heptane as a hydrocarbon dispersion medium and 0.736 g of a maleic anhydride-modified ethylene-propylene copolymer (Mitsui Chemicals, Inc., Hi-WAX 1105A) as a polymeric dispersant were added, the temperature was raised to 80° C. with stirring to dissolve the dispersant, and then the mixture was cooled to 50° C. On the other hand, 92.0 g (1.03 mol) of a 80.5 mass % acrylic acid aqueous solution as a water-soluble ethylenic unsaturated monomer was put in a beaker having an internal volume of 300 mL, 147.7 g of a 20.9-mass % sodium hydroxide aqueous solution was added dropwise with cooling with ice water to perform neutralization of 75 mol %, and then 0.092 g of hydroxyethyl cellulose (Sumitomo Seika Chemicals Company, Limited, HECAW-15F) as a thickener, 0.0736 g (0.272 mmol) of potassium persulfate as a water-soluble radical polymerization agent, and 0.010 g (0.057 mmol) of ethylene glycol diglycidyl ether as an internal crosslinking agent were added thereto and dissolved, thereby preparing a first-stage aqueous liquid. Then, the aqueous liquid prepared above was added to the separable flask and stirred for 10 minutes, and then a surfactant solution obtained by heating and dissolving 0.736 g of sucrose stearate (RYOTO Sugar Ester S-370 manufactured by Mitsubishi-Kagaku Foods Corporation) having an HLB of 3 as a surfactant in 6.62 g of n-heptane in a 20-mL vial was further added. While stirring at a rotation rate of the stirrer of 550 rpm, the inside of the system was sufficiently purged with nitrogen. Thereafter, the flask was immersed in a water bath at 70° C. to be heated, and polymerization was performed for 60 minutes to provide a first-stage polymerization slurry liquid.

On the other hand, 128.8 g (1.43 mol) of a 80.5-mass % acrylic acid aqueous solution as a water-soluble ethylenic unsaturated monomer was put in another beaker having an internal volume of 500 mL, 159.0 g of a 27-mass % sodium hydroxide aqueous solution was added dropwise with cooling with ice water to perform neutralization of 75 mol %, and then 0.091 g (0.381 mmol) of sodium persulfate as a water-soluble radical polymerization initiator and 0.0116 g (0.067 mmol) of ethylene glycol diglycidyl ether as an internal crosslinking agent were added thereto and dissolved, thereby preparing a second-stage aqueous liquid.

The inside of the system in the separable flask was cooled to 25° C. while stirring at a rotation rate of the stirrer of 1,000 rpm, then the whole amount of the second-stage aqueous liquid was added to the first-stage polymerization slurry liquid, and the inside of the system was purged with nitrogen for 30 minutes. Then, the flask was immersed in a water bath at 70° C. again to raise the temperature, and the polymerization reaction was performed for 60 minutes to provide a hydrous gel polymer.

To the hydrous gel polymer after the second-stage polymerization, 4.42 g (1.05 mmol) of a 3-mass % sodium sulfite aqueous solution and 0.589 g (0.526 mmol) of a 45-mass % pentasodium diethylenetriaminepentaacetate aqueous solution were added under stirring. Thereafter, the flask was immersed in an oil bath set at 125° C., and 257.7 g of water was removed to the outside of the system while refluxing n-heptane by azeotropic distillation of n-heptane and water. Thereafter, 4.42 g (0.507 mmol) of a 2-mass % ethylene glycol diglycidyl ether aqueous solution as a surface crosslinking agent was added to the flask, and the mixture was held at 83° C. for 2 hours.

Thereafter, n-heptane was evaporated at 125° C. to dry the mixture, and the mixture was caused to pass through a sieve with a mesh size of 850 μm to provide 223.0 g of a crosslinked polymer.

Example 1

With 100 parts by mass of the crosslinked polymer obtained in Production Example 1, 0.1 parts by mass of 1,3-benzisothiazolin-3-one was mixed in the form of powder to provide a water-absorbing resin. The resulting water-absorbing resin was evaluated for various performances. The results are shown in Table 1.

Example 2

A water-absorbing resin was provided in the same manner as in Example 1 except that the amount of 1,3-benzisothiazolin-3-one was changed to 1.0 part by mass with respect to 100 parts by mass of the crosslinked polymer in Example 1. The resulting water-absorbing resin was evaluated for various performances. The results are shown in Table 1.

Example 3

With 100 parts by mass of the crosslinked polymer obtained in Production Example 2, 5 parts by mass of meso-butane-1,2,3,4-tetracarboxylic acid was mixed in the form of powder to provide a water-absorbing resin. The resulting water-absorbing resin was evaluated for various performances. The results are shown in Table 1.

Example 4

With 100 parts by mass of the crosslinked polymer obtained in Production Example 2, 0.1 parts by mass of chloramine-T trihydrate was mixed in the form of powder to provide a water-absorbing resin. The resulting water-absorbing resin was evaluated for various performances. The results are shown in Table 1.

Example 5

With 100 parts by mass of the crosslinked polymer obtained in Production Example 3, 0.1 parts by mass of trichloroisocyanuric acid was mixed in the form of powder to provide a water-absorbing resin. The resulting water-absorbing resin was evaluated for various performances. The results are shown in Table 1.

Comparative Example 1

With 100 parts by mass of the crosslinked polymer obtained in Production Example 1, 0.1 parts by mass of amorphous silica (Oriental Silicas Corporation, TOKUSIL NP-S) was mixed in the form of powder to provide a water-absorbing resin.

The resulting water-absorbing resin was evaluated for various performances. The results are shown in Table 1.

Comparative Example 2

With 100 parts by mass of the crosslinked polymer obtained in Production Example 1, 1 part by mass of bentonite (Sigma-Aldrich) was mixed in the form of powder to provide a water-absorbing resin. The resulting water-absorbing resin was evaluated for various performances. The results are shown in Table 1.

Comparative Example 3

With 100 parts by mass of the crosslinked polymer obtained in Production Example 2, 1 part by mass of benzalkonium chloride was mixed in the form of powder to provide a water-absorbing resin. The resulting water-absorbing resin was evaluated for various performances. The results are shown in Table 1.

Comparative Example 4

With 100 parts by mass of the crosslinked polymer obtained in Production Example 2, 0.1 parts by mass of potassium persulfate was mixed in the form of powder to provide a water-absorbing resin. The resulting water-absorbing resin was evaluated for various performances. The results are shown in Table 1.

Comparative Example 5

With 100 parts by mass of the crosslinked polymer obtained in Production Example 3, 0.5 parts by mass of meso-butane-1,2,3,4-tetracarboxylic acid was mixed in the form of powder to provide a water-absorbing resin. The resulting water-absorbing resin was evaluated for various performances. The results are shown in Table 1.

TABLE 1

| | Water-absorbing resin | | | |
|---|---|---|---|---|
| | Oxidation-reduction potential (mV) | pH | Median particle diameter (μm) | Physiological saline absorption amount (g/g) |
| Example 1 | 295 | 7.2 | 347 | 60 |
| Example 2 | 307 | 6.2 | 345 | 59 |
| Example 3 | 291 | 6.2 | 339 | 56 |
| Example 4 | 447 | 6.4 | 352 | 59 |
| Example 5 | 738 | 6.1 | 340 | 61 |
| Comparative Example 1 | 241 | 8.5 | 345 | 59 |
| Comparative Example 2 | 240 | 8.1 | 345 | 59 |
| Comparative Example 3 | 234 | 8.5 | 338 | 58 |
| Comparative Example 4 | 247 | 8.5 | 340 | 59 |
| Comparative Example 5 | 243 | 8.4 | 339 | 61 |

The invention claimed is:

1. A water-absorbing resin having an oxidation-reduction potential of a swollen gel of 260 mV or more, as measured by the following oxidation-reduction potential measuring method:

(Oxidation-Reduction Potential Measuring Method)

adding to a beaker, 60 mL of ion exchange water having an oxidation-reduction potential of 390±10 mV;

measuring an oxidation-reduction potential of the ion exchange water after inserting an electrode of a pH meter into the ion exchange water, and leaving standing for 15 minutes;

next, adding 2.0 g of a water-absorbing resin to the ion exchange water that is being stirred at 400 rpm, stirring a resultant mixture to obtain the swollen gel;

inserting an electrode of a pH meter into the swollen gel, leaving standing for 15 minutes, and then measuring the oxidation-reduction potential;

wherein the oxidation-reduction potential of the swollen gel is 1,000 mV or less.

2. The water-absorbing resin according to claim 1, having a physiological-saline absorption amount of 30 g/g or more and 80 g/g or less.

3. The water-absorbing resin according to claim 1, having a median particle diameter of 200 μm or more and 600 μm or less.

4. The water-absorbing resin according to claim 1, wherein a pH of the swollen gel measured by the pH measuring method below is 8.0 or less:

(pH Measuring Method)

mixing and dissolving 25.0 g of urea, 9.0 g of sodium chloride, 0.6 g of magnesium sulfate heptahydrate, 0.7 g of calcium lactate, 4.0 g of potassium sulfate, and 2.5 g of ammonium sulfate in distilled water, wherein a total of 1,000 g of artificial urine is prepared;

diluting urease (derived from jack bean, 50% glycerol solution, 1,000 U/mL) to prepare a 2-U/mL urease aqueous solution;

preparing a test liquid by mixing 30.0 g of the artificial urine and 1.0 mL of the urease aqueous solution;

placing the test liquid into a petri dish containing 1.0 g of the water-absorbing resin to obtain the swollen gel, and immediately sealing the swollen in a 2-L Tedlar bag, and removing air in the bag;

using a 200-mL glass syringe, 900 mL (total volume) of dry air that has passed through an activated carbon bed is added into the 2-L Tedlar bag;

storing the 2-L Tedlar bag in which the swollen gel is sealed for 24 hours in a tabletop thermo-hygrostat set at a temperature of 35±2° C. and a relative humidity of 60±2%;

removing the swollen gel after storage for 24 hours from the 2-L Tedlar bag, adding to a beaker together with 200 g of physiological saline, and stirring with a stirrer for 1 minute; and measuring a pH of the content of the beaker using a pH meter.

5. An absorber comprising the water-absorbing resin according to claim 1.

6. An absorbent article comprising the absorber according to claim 5.

* * * * *